(12) United States Patent
Byrd

(10) Patent No.: US 8,778,184 B2
(45) Date of Patent: Jul. 15, 2014

(54) MODULAR BIOREACTOR SYSTEM

(76) Inventor: Derek Byrd, Rochester Hills, MI (US)

( * ) Notice: Subject to any disclaimer, the term of this patent is extended or adjusted under 35 U.S.C. 154(b) by 501 days.

(21) Appl. No.: 13/269,856

(22) Filed: Oct. 10, 2011

(65) Prior Publication Data

US 2012/0091058 A1    Apr. 19, 2012

Related U.S. Application Data

(60) Provisional application No. 61/455,063, filed on Oct. 15, 2010.

(51) Int. Cl.
*C02F 3/32* (2006.01)
*C02F 3/10* (2006.01)
*A01K 63/04* (2006.01)

(52) U.S. Cl.
USPC ...... 210/602; 210/615; 210/167.22; 210/903; 119/227

(58) Field of Classification Search
USPC ............ 210/602, 615, 616, 617, 621, 167.22, 210/903, 906, 912; 119/227, 260
See application file for complete search history.

(56) References Cited

U.S. PATENT DOCUMENTS

| | | | |
|---|---|---|---|
| 3,661,262 A * | 5/1972 | Sanders | 210/167.22 |
| 3,973,519 A * | 8/1976 | McCarty et al. | 119/227 |
| 4,356,665 A | 11/1982 | de Oliveira | |
| 5,269,094 A | 12/1993 | Wolverton et al. | |
| 5,385,590 A | 1/1995 | Sledge | |
| 5,555,676 A | 9/1996 | Lund | |
| 5,829,191 A | 11/1998 | Gatliff | |
| 6,189,262 B1 | 2/2001 | Gatliff | |
| 6,200,469 B1 | 3/2001 | Wallace | |
| 6,406,627 B1 | 6/2002 | Wallace | |
| 6,830,688 B2 | 12/2004 | Austin et al. | |
| 7,055,282 B2 | 6/2006 | Bryan, III | |
| 7,390,400 B2 | 6/2008 | Geneys et al. | |
| 2003/0111409 A1 | 6/2003 | Austin et al. | |
| 2007/0011844 A1 | 1/2007 | Aoki et al. | |
| 2009/0301399 A1 | 12/2009 | Brown et al. | |
| 2010/0031893 A1 | 2/2010 | Bodlovich et al. | |
| 2010/0199555 A1 | 8/2010 | Pole | |

FOREIGN PATENT DOCUMENTS

| | | | |
|---|---|---|---|
| JP | 3-178397 A | * | 8/1991 |
| JP | 3-196897 A | * | 8/1991 |
| JP | 3-296496 A | * | 12/1991 |
| JP | 2002-58387 A | * | 2/2002 |

OTHER PUBLICATIONS

International Search Report for PCT/US2011/055958, mailed May 23, 2012.*

* cited by examiner

*Primary Examiner* — Fred Prince
(74) *Attorney, Agent, or Firm* — Gifford, Krass, Sprinkle, Anderson & Citkowski, P.C.

(57) ABSTRACT

A modular, vertical bioreactor system includes a plurality of vertical bioreactor chambers each of which encloses an interior volume and has a height dimension which is greater than its width dimension; a drain manifold which maintains the bioreactor chambers in a spaced apart relationship and defines a fluid channel which is in fluid communication with each of the vertical bioreactor chambers; and, a fluid delivery assembly which delivers a fluid to each of the bioreactors. The system may be reconfigured so as to accommodate varying applications. The system may be integrated with an aquaculture system.

16 Claims, 4 Drawing Sheets

MODULAR BIOREACTOR SYSTEM

CROSS-REFERENCE TO RELATED APPLICATIONS

This application claims priority of U.S. Provisional Patent Application No. 61/455,063 filed Oct. 15, 2010, and entitled "Aquaponic System", the disclosure of which is incorporated herein by reference.

FIELD OF THE INVENTION

This invention relates generally to systems for the treatment of wastewater. More specifically, the invention relates to bioreactor systems for treatment of wastewater by phytoremediation processes involving rhizofiltration, aerobic degradation, microbial breakdown, substrate mediated catalysis, and catalytic degradation reactions.

BACKGROUND OF THE INVENTION

Large volumes of wastewater are generated in residential, municipal, industrial, and agricultural settings as a result of human activity. Waste streams generated by industrial and agricultural activities include a wide variety of contaminant materials including organic chemicals, inorganic compounds and elemental substances, and biological waste, as for example nitrogenous waste, thiols, mercaptans, and sulfides. A major limitation of present water treatment technology is the costly nature of managing volumes of wastewater. Ideally, wastewater treatment systems should be implemented at or very near the source of wastewater so as to avoid costs associated with transporting fluid waste.

Presently, aquaculture is a growing technology for food production. Aquaculture involves the farming of fish or other aquatic organisms under controlled conditions so as to maximize the quality and amount of food protein which can be generated in a given area. Aquaculture effluent is composed of animal waste and undigested feed including lipids, amino acids, proteins, minerals, polysaccharides, and ammonia ($NH_3$) and ammonium ions ($NH_4^+$). Aquatic organisms experience toxic effects of elevated ammonia concentrations including gill damage, red blood cell damage, and a reduction in the blood's ability to carry oxygen, together with an increase in oxygen demand by tissue. Exposure to elevated levels of nitrogenous waste may be toxic to aquatic organisms, while exposure to lower levels can result in significant inhibition of growth and an increase in the incidence of disease. Hence, it is of paramount importance to control the levels of nitrogenous compounds in an aquaculture system.

Nitrogenous waste derived from aquaculture can be converted into a nutrient in connection with the growth of autotrophs such as green plants, algae, and other heterotrophic microorganisms, and such waste has been used successfully for the hydroponic cultivation of vegetation and microbes in a technology referred to as "aquaponics". Conventional aquaponic techniques simply involve the application of nitrogenous wastewater streams to cultivated plots of growing plants. This approach consumes a large amount of space which could be utilized more efficiently for the production of aquaculture-derived protein. Furthermore, such techniques do not allow for the easy recovery of purified water for reuse in an aquaculture system. Consequently, the art has sought to implement compact, closed systems in which the plants are grown in a controlled environment which allows for introduction and removal of a fluid stream. However, such prior art systems require complex planter beds and are difficult to transport and utilize. Further, separation of individual plants, planters, or plant units from a hydroponic system and/or planter bed of the prior art without damaging the root system of the plant can be difficult. As a consequence, such technologies are not commercially feasible and do not lend themselves to a scale up and automation.

As will be explained in detail hereinbelow, the present invention is directed to a hydroponic wastewater treatment system which is modular and may be readily integrated with an aquaculture system. In that regard, the system may be reconfigured in size and shape as may be necessary during the growth and harvest cycle of the plants and/or aquatic organisms. The system of the present invention allows for complete control of the input and extraction of water from the hydroponic system and thus may be advantageously employed in locations and implementations where conservation of water is important. These and other advantages of the invention will be apparent from the drawings, discussion, and description which follow.

SUMMARY OF THE INVENTION

Disclosed is a modular, vertical bioreactor system. The system includes a plurality of vertical bioreactor chambers, each chamber having a height dimension which is greater than its width dimension and each chamber at least partially enclosing an interior volume. The system further includes a drain manifold which is configured and operable to retain the plurality of vertical bioreactor chambers in a spaced apart relationship. The manifold defines a fluid channel which is in fluid communication with the interior volume of each of the plurality of vertical bioreactor chambers. The system also includes a fluid delivery assembly which is capable of being connected to a source of fluid and is configured and operable to deliver a fluid from the source to the interior volume of each of the plurality of vertical bioreactors. In particular embodiments, the bioreactor system may be utilized in conjunction with an aquaculture process wherein it functions to remove waste materials from process fluids.

In particular embodiments, the drain manifold is a multipart assembly including a plurality of interconnectable sections wherein at least some of the sections are support sections configured and operable to retain at least one of the vertical bioreactor chambers. In this embodiment, one or more sections of the multipart manifold may be a connector section which is configured and operable to interconnect at least two of the support sections.

In specific embodiments, the drain manifold may include at least one removable end cap which allows for connection of further components to the manifold. The system may also include a pump which is in fluid communication with a fluid channel of the drain manifold. The fluid delivery assembly may be configured and operable so as to selectively and independently deliver a flow of fluid to each of the plurality of vertical bioreactor chambers.

The vertical bioreactor chambers may be configured and operable to retain a volume of plant growth medium therein. In some instances, at least portions of at least some of the vertical bioreactor chambers are transparent to visible light.

The system may also include a ventilator operative to draw an ambient atmosphere through at least some of the vertical bioreactor chambers, and the ventilator may be in fluid communication with the fluid channel of the drain manifold.

The system of the present invention may be used for remediating a body of fluid so as to remove a waste material therefrom. This body of fluid may comprise waste containing material from an industrial, agricultural, or aquacultural process; and in some instances, the remediated fluid may be reintroduced back into the process from which it was derived.

DETAILED DESCRIPTION OF THE PREFERRED EMBODIMENTS

The bioreactor system of the present invention is highly modular and hence may be configured for a number of different applications. Likewise, the system may be reconfigured while in use to accommodate changing needs and conditions. Hence, it is to be understood that the present invention may be implemented in a number of embodiments; and while the invention will be explained with regard to some specific embodiments, other embodiments are within the scope of the invention and will be readily apparent to those of skill in the art.

Figure 1:
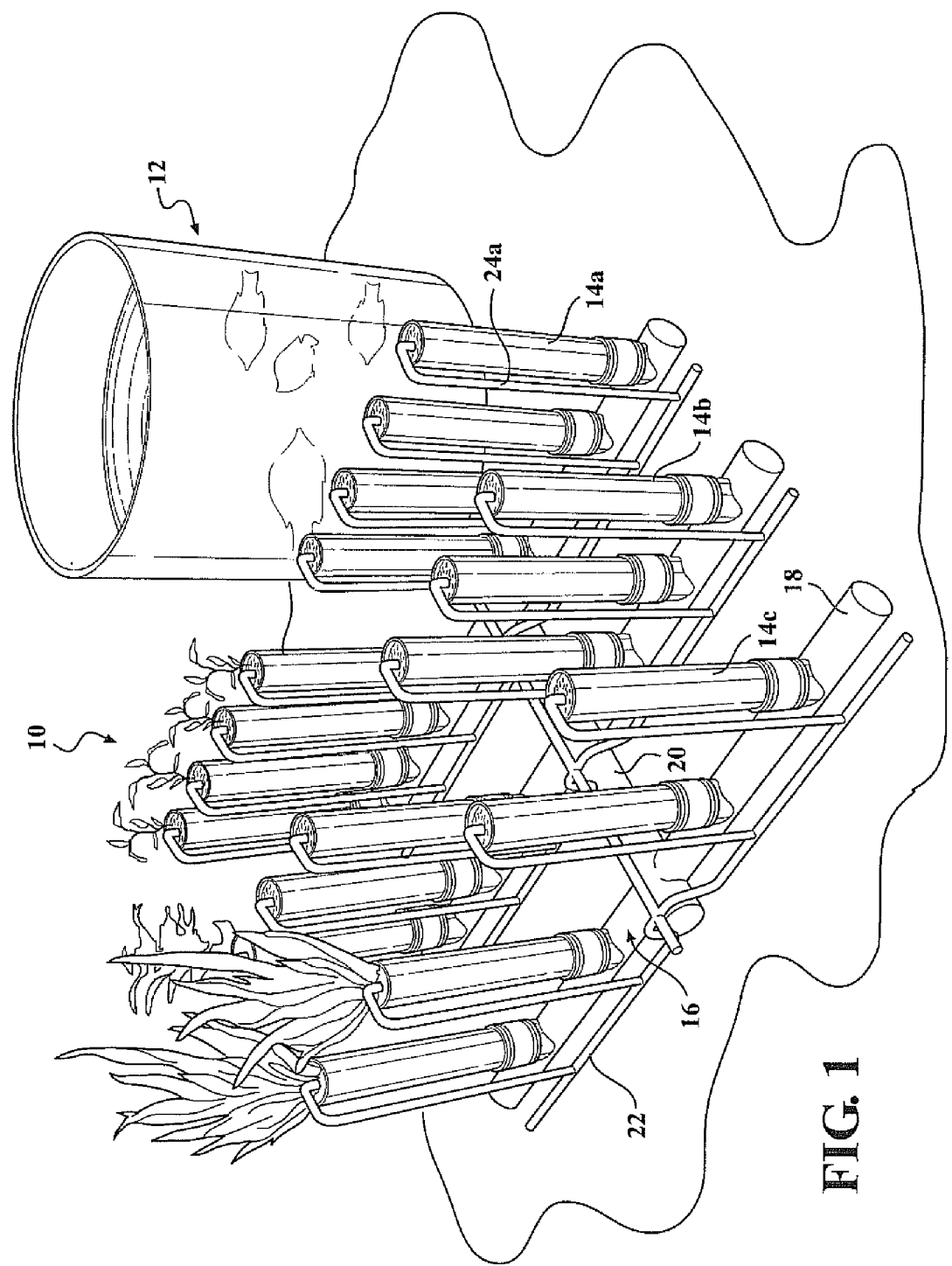
FIG. 1 is a perspective view of one embodiment of bioreactor system in accord with the present invention.

Referring now to FIG. 1, there is shown one particular bioreactor system 10 of the present invention as implemented in connection with an aquaculture process wherein fish are being raised in a confined body of water represented by a tank 12. Although not depicted, it will be understood by those of skill in the art that the tank 12 will include ancillary features such as an aeration and micro-aeration system, a feeder system, a temperature control system, and the like for maintaining optimum growth conditions for raising fish. The bioreactor system of the present invention operates to process the water used in the aquaculture operation so as to remove waste materials, and in particular nitrogenous waste materials, therefrom.

The system 10 of FIG. 1 includes a plurality of vertical bioreactor chambers, such as representative chambers 14a, 14b and 14c. The chambers 14 are referred to herein as "vertical" bioreactor chambers since they are configured so that their height dimension is greater than their width dimension. In general, the height of the vertical bioreactor chambers will be at least twice, and in specific instances at least five times greater than, their width dimension. In this particular embodiment, the bioreactor chambers are configured as cylindrical members, although other shapes are contemplated within the scope of this invention.

Each bioreactor chamber is configured to define an interior volume which can retain a growth medium therein. This growth medium may comprise a plant growth medium such as soil, vermiculite, expanded clay, porous synthetic organic or inorganic materials, and combinations thereof. The growth medium may also comprise a medium for the growth of fungi, algae, bacteria, protozoans, nematodes, or annelids and as such may comprise a particulate medium, a solid material, sheets or fibers, a slurry, or the like. In those instances where the bioreactor chambers are used for the growth of plants, they will generally be fabricated from an at least partially opaque material; however, in other instances, the nature of the organisms being cultivated therein will require that at least a portion of the chambers be made light transparent. All of such implementations may be readily accomplished by those of skill in the art.

The bioreactor chambers 14 are supported by and upon a drain manifold 16. Support may be by a rubber coupling, a molded-in connector, or any other such means as will be apparent to those of skill in the art. This drain manifold 16 defines an interior space which constitutes a fluid channel, and this fluid channel is in communication with the interior volume of each of the vertical bioreactor chambers 14 supported thereupon. The drain manifold 16 of FIG. 1 includes a plurality of individual support sections, for example support section 18, which each engage and support at least one vertical bioreactor. The support sections are connected to connector portions, such as connector portion 20 which in this instance defines a central channel communicating with the drain channels of each of the support portions. In this manner, the interior volumes of each of the vertical bioreactors are in common communication with the drain channel of the manifold.

The installation of FIG. 1 further includes a fluid delivery assembly 22 which is connectable with a source of fluid such as water in the tank 12, and which operates to deliver that fluid to the vertical bioreactors. In this regard, the fluid delivery assembly 22 includes a plurality of individual riser pipes, such as riser pipe 24a, which each deliver fluid to respective vertical bioreactor. As will be explained in greater detail hereinbelow, the fluid delivery assembly may include one or more valves, pumps, filters, and the like, and may be operable so as to selectively and independently deliver fluid to each of the vertical bioreactors 14 as may be needed.

The fluid delivered to the vertical bioreactors carries nutrient materials which, as depicted in this embodiment, foster the growth of plants and microbial organisms. The plants, substrate chemistry, and microbial ecology in turn consume nitrogenous waste products and/or other unwanted components of the fluid stream thereby remediating the fluid. The remediated fluid which has flowed through the vertical bioreactor chambers is collected in the drain manifold. This fluid may be redirected back to the aquaculture tank 12, or it may be utilized in some other process.

It will be seen from FIG. 1 that the spacing and number of the vertical bioreactor chambers 14 on the manifold 16 may be varied. Such may be accomplished by adding or removing chambers on a particular manifold segment or by entirely replacing a manifold segment. The ability to configure and reconfigure the system while it is in use is significant since it allows for plants being grown in bioreactor chambers to be maintained at an ideal spacing. As will be seen from FIG. 1, as the plants grow in size, spacing of the individual bioreactor chambers may be increased to accommodate increasing plant size. Also, it is significant that the vertical configuration of the bioreactors allows for the efficient growth of a single plant in each chamber. Thus, harvesting of individual plants may be readily accomplished without disturbing root systems of adjoining plants. Therefore, the modular nature of the system permits plants to be grown in an optimum density so as to maximize the amount of plant material produced, and hence the volume of fluid which may be remediated in a given area.

Figure 2:
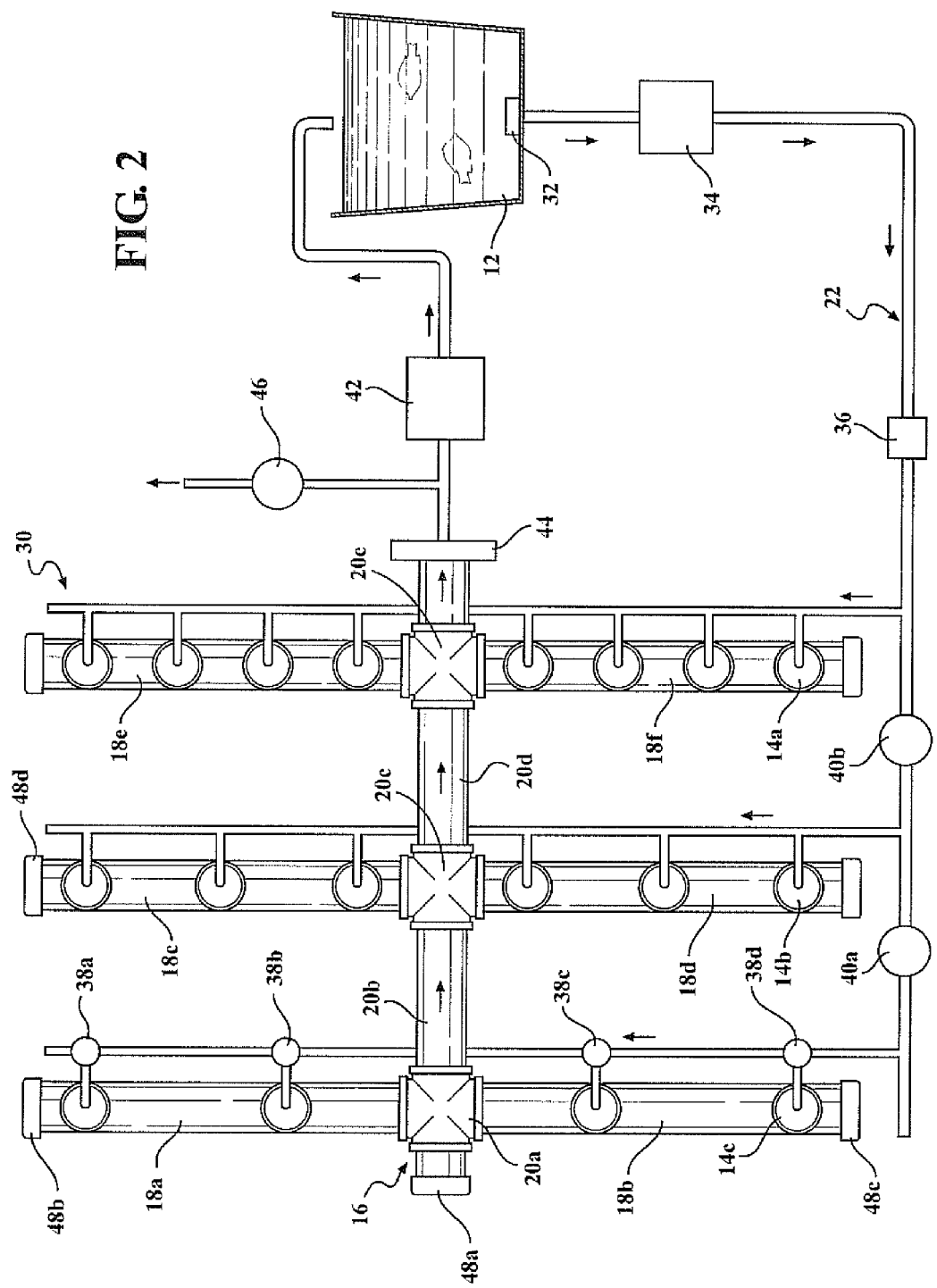
FIG. 2 is a schematic depiction of a bioreactor system of the present invention.

Referring now to FIG. 2, there is shown a schematic depiction of a bioreactor system 30 generally similar to that of FIG. 1. The system 30 of FIG. 2 includes a plurality of bioreactor chambers, for example chambers 14a, 14b and 14c, all of which are shown in a top plan view herein. Bioreactor chambers 14 are supported by and in communication with a drain manifold 16 and a fluid delivery assembly 22 as generally described above.

The drain manifold 16 of this embodiment is a multipart assembly which includes a number of interconnectable sections. Some of the sections are support sections 18*a*, 18*b*, 18*c*, 18*d*, 18*e* and 18*f* which are configured to engage and support the vertical bioreactor chambers in a vertical orientation. These support sections 18 are joined together by a number of connector sections 20*a*-20*e*, and it will be noted that connector sections 20*a*, 20*c* and 20*e* are all four port cross-shaped connector sections, while connector sections 20*b* and 20*d* are straight sections. As will be appreciated, connector sections may be variously configured to allow for other implementations of the invention and in that regard may comprise curved connector sections, T-shaped connector sections, L-shaped connector sections, and the like. The drain manifold 16 provides and defines a drain channel which is in communication with the interior volumes of each of the vertical bioreactors 14 and in that regard serves to collect and drain fluid therefrom.

Further shown in FIG. 2 is a fluid delivery assembly 22 which operates to convey fluid from a source, which in this instance is an aquaculture tank 12, to each of the vertical bioreactors 14. In this embodiment, fluid delivery system 22 includes an intake port 32 disposed within the tank 12. This intake port is generally placed near the bottom of the tank and will typically include a screen, filter, or the like to prevent undue amounts of particulate matter or foreign objects from passing into the fluid delivery assembly. The fluid delivery assembly 22 may include a pump 34 disposed so as to move fluid from the tank 12 to the bioreactors 14 and the flow of the fluid is generally indicated by the arrows. In some instances, additional pumps may be placed further downstream in the system to maintain a fluid flow, and one such pump is shown at reference numeral 36. It is to be understood that yet other pumps may be placed downstream in the system. And, in still other implementations, fluid flow may be maintained at least in part by gravity and controlled by one or more solenoid valves.

The fluid delivery assembly is operational to direct an individual flow of fluid to each of the vertical bioreactors and may be particularly configured so as to allow the flow of fluid to each of the bioreactors to be separately and independently adjusted. In that regard, the riser or the delivery pipe associated with each of the vertical bioreactors may include a valve, such as the valves 38*a*-38*d* shown herein as being associated with the vertical bioreactors retained by the support sections 18*a* and 18*b* of the drain manifold 16. Further shown in FIG. 2 are flow valves 40*a* and 40*b* disposed so as to isolate portions of the fluid delivery assembly for purposes of further controlling fluid flow. As will be apparent to those of skill in the art, the fluid flow valves may be otherwise placed. They may also be increased or decreased in number. For example, in large systems operating under high pressure, one or more valves such as those shown at 40*a* and 40*b* may be placed along the lines running parallel to the manifold segments 18. All of these valves 38, 40 may comprise simple on/off valves or they may be metering valves, and may be under manual or automatic control and in some instances may be controlled by a control circuit which further operates to sense moisture levels in particular of the vertical bioreactors or monitor water chemistry of the fluid source.

In the operation of the system, fluid is withdrawn from the fluid source via the inlet 32 and delivered by the fluid delivery assembly to one or more of the individual bioreactor chambers 14. This fluid percolates through the growth medium or other material disposed in the chamber and in the course of doing so is bioremediated, catalytically converted, or otherwise converted by the plants or other organisms which are being grown in the bioreactor chambers. The remediated fluid is collected by the drain manifold and returned to the tank 12 or to such other location as may be desired. The flow of fluid may be aided by a pump 42, and in particular embodiments a screen or filter 44 may be disposed in the remediated fluid stream.

In many instances it is necessary and desirable to control the moisture, oxygen, contaminant, and temperature levels in the growth medium, and this may be accomplished by controlling the amount of fluid delivered to the bioreactor chambers by the fluid delivery assembly as discussed above. Also, growth conditions within the chamber may be further optimized by controlling the flow of an ambient atmosphere through the chambers. This may be accomplished by use of a fan, pump, or other such ventilation device which is in communication with the interior volumes of the chambers. In one particular implementation, a ventilator fan 46 is disposed in fluid communication with the drain channel of the manifold 16. This ventilator fan 46 exhausts gases from (or inputs gases to) the drain channel and serves to establish a controlled flow of gases through the bioreactors. Flow of a selected atmosphere through individual chambers may be selectively controlled by use of baffles, valves, or the like associated therewith.

The modular nature of the system of the present invention allows for the simple incorporation of other devices including monitoring devices, pumps, filters, delivery devices, and the like into the system. In this regard, the end portions of the components of the manifold may be fitted with removable covers such as covers 48*a*, 48*b*, 48*c*. Likewise, the various segments of the fluid delivery system 22 may be configured to include releasable connectors and caps so as to allow for the expansion and reconfiguration of the fluid delivery system.

It will be appreciated that in this manner the systems of the present invention may be readily configured and reconfigured for various applications. In the plant growth mode, the number, spacing, and in some instances size, of the vertical bioreactor chambers may be changed. Also, configuration of the fluid delivery assembly and drain manifold may likewise be varied as appropriate. The system may also be reconfigured to accommodate changes in the volume or concentration of the waste fluid being treated. The modular nature of the system also allows it to be readily assembled and disassembled for transport.

Figure 3:
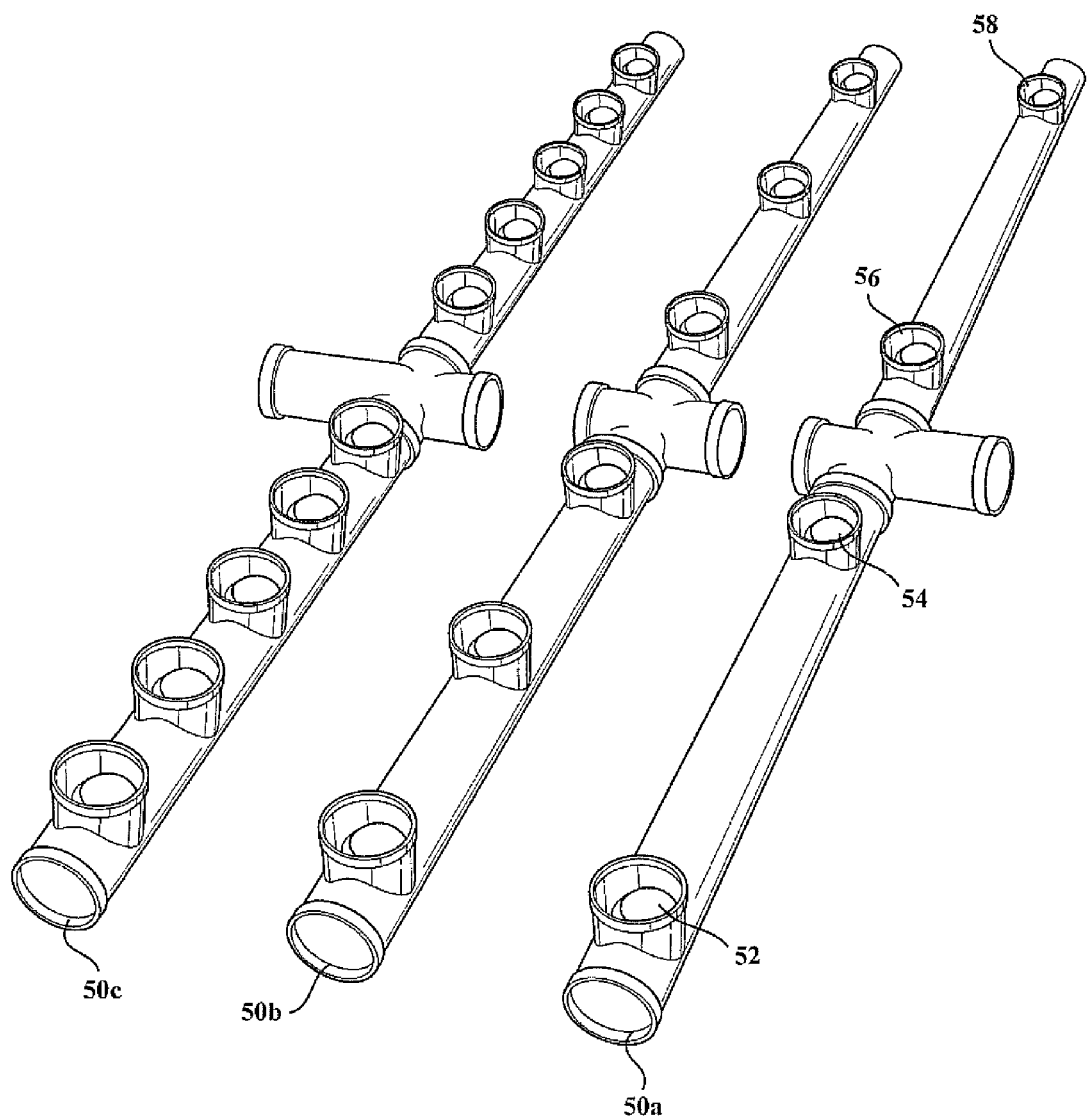
FIG. 3 is a perspective view showing four different support sections of a drain manifold of the present invention.

Referring now to FIG. 3, there is shown a perspective view of some particular configurations of components of the modular drain manifold system. Component 50*a* is a manifold segment which is configured to retain and support four vertical bioreactor chambers and in this regard includes four separate coupling portions 52, 54, 56 and 58. As shown herein, these coupling portions are simple collars and are configured to engage, either directly or indirectly, a cylindrical end portion of a bioreactor chamber. In other embodiments, the couplers may include retention features such as threads, locking lugs, flanges, ferrules, "O" rings, or the like. In some particular instances, coupling may be simply accomplished by the use of an elastomeric sleeve which retains the bioreactor chambers in engagement with the coupling portion of the manifold. As will be seen from FIG. 3, the end portion of the manifold segment is open and, as explained hereinabove, this end portion may be sealed off by a cap or bulkhead member, and this seal may be reversible or permanent. FIG. 3 also shows manifold segments 50*b* and 50*c* which are generally similar to the segment 50*a* but which are configured to retain six and ten vertical bioreactors respectively.

The vertical bioreactors used in the present invention may be of various configurations. In a simple embodiment, they are comprised of cylindrical segments of tubing. Typical lengths range from 1 to 5 feet, and typical diameters are in the range of 2 inches to 2 feet. In some specific embodiments, the diameter of the segments is in the range of 4 to 12 inches and length in the range of 1 to 4 feet.

Figure 4:
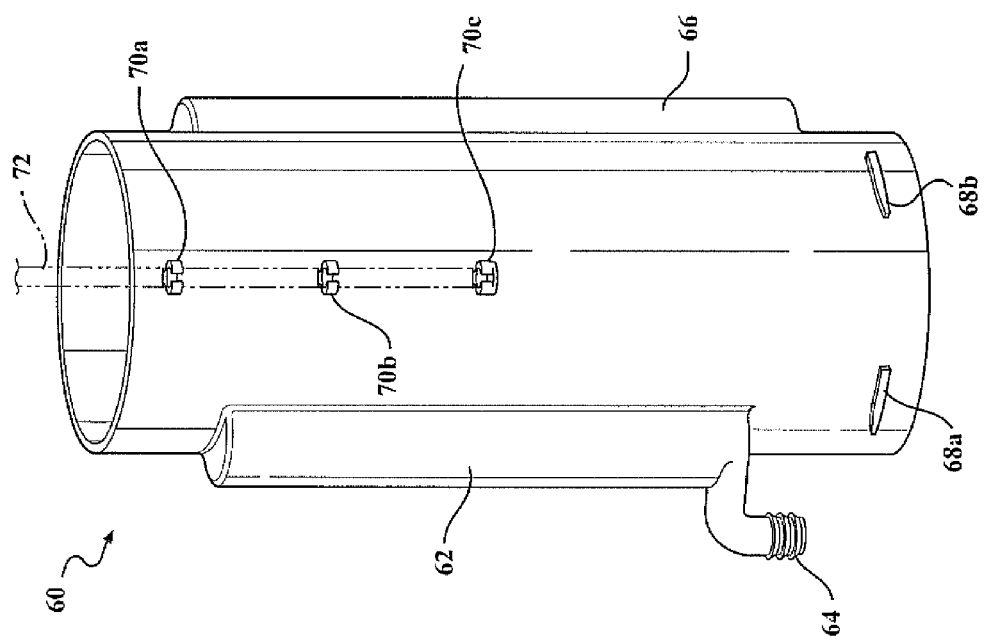
FIG. 4 is a perspective view of a vertical bioreactor chamber which may be utilized in the present invention.

In some instances, vertical bioreactor chambers may be specifically configured to include dedicated structures in accord with the present invention. FIG. 4 is a perspective view of one particular configuration of vertical bioreactor chamber 60 which may be used in the practice of the present invention. This chamber 60 is, in particular instances, fabricated from a molded polymeric material and is of a generally cylindrical configuration. The chamber has a fluid supply riser portion 62 integrally molded therewith, and this fluid supply riser portion 62 includes a barbed fitting 64 which is configured to be engageable with a fluid supply line. The vertical bioreactor 60 of FIG. 4 further includes an overflow drain portion 66 also integrally molded therewith and incorporates locking lugs 68a, 68b at its lower end, for engagement with the drain manifold. The bioreactor 60 also includes retention clips 70a, 70b and 70c molded thereinto. These clips 70 function to retain an auxiliary item such as a plant support trellis shown in dotted outline at 72.

Figure 5:
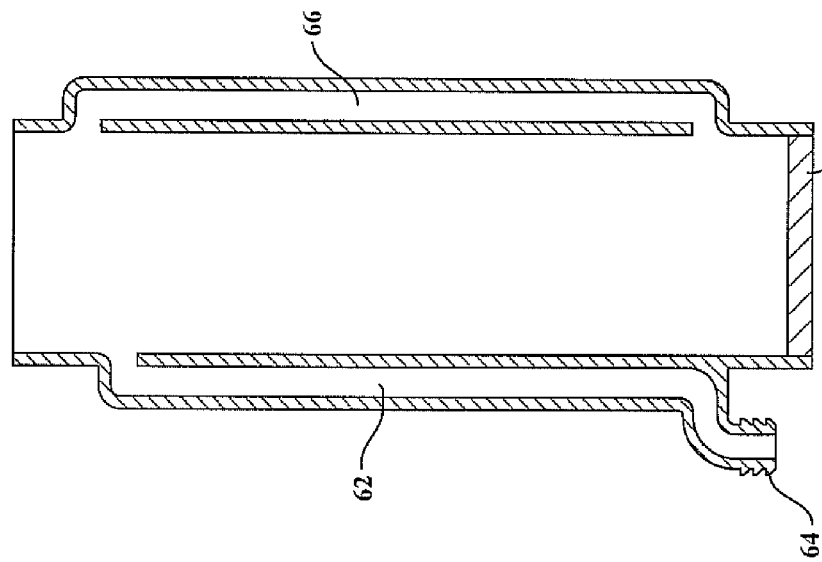
FIG. 5 is a cross-sectional view of the vertical bioreactor chamber of FIG. 4.

Referring now to FIG. 5, there is shown a cross-sectional view of the vertical bioreactor 60 of FIG. 4. FIG. 5 better illustrates the interior structure of the fluid supply riser 62 and overflow drain 66. As will be noted from FIG. 5, the vertical bioreactor 60 includes a screen portion 74 integrally molded into the bottom end thereof. The screen portion 74 serves to aid in retaining a growth medium within the chamber. Further features such as cleanout ports, handles, and the like may also be molded into the vertical bioreactor.

EXPERIMENTAL

The efficacy of a system of the present invention of the type generally shown in FIGS. 1 and 2 was evaluated. The effluent was derived from a body of water in which fish having weights ranging from 250-450 g were stocked at a density of 100 fish/m$^3$ in a 700 gallon system. This effluent was run through a bioreactor system of the present invention which included 24 vertical bioreactor chambers each having a volume capacity of 5145 cm$^3$. Each bioreactor contained a growth medium comprising lightweight expanded clay aggregate and contained mature (1 kg total weight) terrestrial plants with established root development. Levels of nitrate, ammonia, phosphorus, potassium, calcium, magnesium, sulfate, iron, copper, manganese, zinc, boron, molybdenum, and chloride were measured before the effluent was input into the system and following a 2 minute bioreactor contact treatment time. In this system the sole source of nutrients came from the fish feed and the resultant aquaculture effluent. Data is summarized in Table 1 hereinbelow.

TABLE 1

| PARAMETER | INPUT (ppm) | OUTPUT (ppm) | REDUCTION (%) |
|---|---|---|---|
| Nitrate-N (NO$_3$) | 27.700 | 24.500 | 11.6 |
| Ammonia-N (NH$_3$) | 1.750 | 0.320 | 81.7 |
| Phosphorus (P) | 3.840 | 3.310 | 13.8 |
| Potassium (K) | 6.700 | 5.750 | 14.2 |
| Calcium (Ca) | 55.260 | 54.010 | 2.3 |
| Magnesium (Mg) | 9.940 | 9.310 | 6.3 |
| Sulfate-S (SO$_4$) | 33.900 | 33.800 | 0.3 |
| Iron (Fe) | 0.056 | 0.050 | 10.7 |
| Copper (Cu) | 0.005 | 0.003 | 33.3 |
| Manganese (Mn) | 0.040 | 0.030 | 25.0 |
| Zinc (Zn) | 0.072 | 0.032 | 55.6 |//

TABLE 1-continued

| PARAMETER | INPUT (ppm) | OUTPUT (ppm) | REDUCTION (%) |
|---|---|---|---|
| Boron (B) | 1.910 | 2.160 | −13.1 |
| Molybdenum (Mo) | 0.030 | 0.030 | 0.0 |
| Chloride (Cl) | 19.350 | 21.400 | −10.6 |

As will be seen, even following a relatively brief contact time, very significant reductions in critical contaminants ammonia and nitrate were achieved. Likewise, significant reductions in critical metals copper, manganese, zinc, and iron were also realized. As such, the treated water stream was suitable for reintroduction into the aquaculture system or for use in other applications.

The systems of the present invention may be manufactured from a variety of materials including metals, polymeric materials, ceramics, natural materials such as bamboo, composites, and various combinations of the foregoing. In some particular instances, polymeric materials such as polyvinylchloride have been found to be particularly advantageous for use in the present invention since such materials are inert, lightweight, and rugged and can be easily molded into a variety of shapes.

As noted above, the present invention is modular and may be implemented in a number of different configurations. Further, sensor and control systems such as temperature control systems, gas sensors, ion sensors, electrometric sensors, and the like may be readily incorporated therein as may be fluid handling components such as auxiliary pumps, ventilators, and the like. While the foregoing system was shown as being utilized in connection with an aquaculture installation, it is to be understood that the system of the present invention may be implemented in other bioremediation applications. For example, it has been found that certain plants and catalytic substrates are very effective in sequestering lead and other heavy metals. In some circumstances the bioreactors can be operated using only microbial biomass and selective substrates to sequester, chelate, and biotransform waste products in the effluent. In such instance the system may be operated to remove contaminants from industrial process fluids, contaminated groundwater, and the like. All of such modifications and variations of the invention are within the scope of the present invention. The foregoing drawings, discussion, and description are illustrative of some specific embodiments but are not meant to be a limitation upon the practice of the invention. It is the following claims, including all equivalents, which define the scope of the invention.

The invention claimed is:

1. A modular, vertical bioreactor system comprising:
a plurality of vertical bioreactor chambers, each chamber having a height dimension which is greater than its width dimension, each chamber at least partially enclosing an interior volume;
a drain manifold which is configured and operable to retain said plurality of vertical bioreactor chambers in a spaced apart relationship, said manifold defining a fluid channel which is in fluid communication with the interior volume of each of said plurality of vertical bioreactor chambers; and
a fluid delivery assembly which is capable of being connected to a source of fluid and is configured and operable to deliver a fluid from said source to the interior volume of each of the plurality of vertical bioreactors.

2. The system of claim 1, wherein said drain manifold is a multipart assembly including a plurality of interconnectable sections wherein at least some of said sections are support sections, each support section being configured and operable to retain at least one of said vertical bioreactor chambers.

3. The system of claim 2, wherein at least one of said sections of said multipart manifold is a connector section which is configured and operable to interconnect at least two of said support sections.

4. The system of claim 1, wherein said drain manifold includes at least one removable end cap.

5. The system of claim 1, wherein said drain manifold is configured and operable to releasably retain said plurality of vertical bioreactor chambers.

6. The system of claim 1, further including a pump which is in fluid communication with the fluid channel defined by the drain manifold.

7. The system of claim 1, wherein said fluid delivery assembly is configured and operable so as to selectably and/or independently deliver a flow of fluid to each of said plurality of vertical bioreactor chambers.

8. The system of claim 1, wherein said vertical bioreactor chambers are each configured to retain a volume of a growth medium therein.

9. The system of claim 1, wherein at least some of said vertical bioreactor chambers are at least partially transparent to visible light.

10. The system of claim 1, wherein said system farther includes a ventilator operative to flow an ambient atmosphere through at least some of said vertical bioreactor chambers.

11. The system of claim 10, wherein said ventilator is in fluid communication with the fluid channel of said drain manifold.

12. The system of claim 1, wherein said fluid delivery assembly is in fluid communication with a source of fluid which fluid includes a waste material dissolved or suspended therein, said waste material being selected from the group consisting of: agricultural waste, animal waste, industrial waste, and combinations thereof.

13. The system of claim 1, wherein said vertical bioreactor chambers comprise cylindrical members, each having a length dimension which is at least five times greater than its diameter.

14. The system of claim 1, wherein said vertical bioreactor chambers include a growth medium for supporting growth of an organism, said organism being selected from the group consisting of: fungi, algae, bacteria, yeast, protozoans, green plants, autotrophs, and heterotrophs.

15. A method for remediating a body of fluid containing a waste material therein, said method comprising the steps of
providing a bioreactor system in accord with claim 1;
disposing a growth medium in said vertical bioreactor chambers;
disposing an organism in said vertical bioreactor chambers;
delivering said fluid containing said waste material to said vertical bioreactor chambers whereby said organism disposed in said chamber consumes and/or converts said waste material so as to remove at least a portion of said waste material from said fluid; and
draining said fluid from said chambers through said fluid channel of said drain manifold.

16. The method of claim 15, wherein said fluid is derived from an aquaculture process and includes a nitrogenous waste material therein.

* * * * *